(12) United States Patent
Musah et al.

(10) Patent No.: US 9,374,250 B1
(45) Date of Patent: Jun. 21, 2016

(54) WIRELINE RECEIVER CIRCUITRY HAVING COLLABORATIVE TIMING RECOVERY

(71) Applicant: Intel Corporation, Santa Clara, CA (US)

(72) Inventors: Tawfiq Musah, Hillsboro, OR (US); Gokce Keskin, Hillsboro, OR (US); Ganesh Balamurugan, Urbana, IL (US); James E. Jaussi, Hillsboro, OR (US); Bryan K. Casper, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/573,343

(22) Filed: Dec. 17, 2014

(51) Int. Cl.
*H03H 7/30* (2006.01)
*H04L 25/03* (2006.01)
*H04L 7/02* (2006.01)

(52) U.S. Cl.
CPC ............ *H04L 25/03057* (2013.01); *H04L 7/02* (2013.01)

(58) Field of Classification Search
CPC ............................ H04L 25/03057; H04L 7/02
See application file for complete search history.

(56) References Cited

U.S. PATENT DOCUMENTS

| 8,472,515 | B1 * | 6/2013 | Savoj | ............................ 375/233 |
| 2003/0011847 | A1 * | 1/2003 | Dai et al. | ...................... 359/161 |
| 2008/0165841 | A1 * | 7/2008 | Wall | ........................... H03L 7/08 375/232 |
| 2008/0187036 | A1 * | 8/2008 | Park | ................... H04L 25/03146 375/233 |
| 2010/0061440 | A1 * | 3/2010 | Lee | ........................ H03L 7/0807 375/233 |
| 2012/0257652 | A1 * | 10/2012 | Malipatil et al. | ............... 375/219 |
| 2014/0286381 | A1 * | 9/2014 | Shibasaki | ...................... 375/226 |
| 2014/0307769 | A1 * | 10/2014 | He | ........................ H04L 7/0062 375/233 |

OTHER PUBLICATIONS

Bulzacchelli, John F., et al., "A 28Gb/s 4-Tap FFE/15-Tap DFE Serial Link Transceiver in 32nm SOI CMOS Technology,", IEEE Journal of Solid-State Circuits, vol. 47, No. 12, (Dec. 2012), 3232-3245.
Spagna, F., et al., "A 78mW 11.8Gb/s Serial Link Transceiver with Adaptive RX Equalization and Baud-Rate CDR in 32nm CMOS", Solid-State Circuits Conference Digest of Technical Papers (ISSCC), 2010 IEEE International, (Feb. 7, 2010), 366-367.

* cited by examiner

*Primary Examiner* — Syed Haider
(74) *Attorney, Agent, or Firm* — Schwegman Lundberg & Woessner, P.A.

(57) ABSTRACT

Some embodiments include apparatus and methods having an input to receive an input signal, additional inputs to receive clock signals having different phases to sample the input signal, and a decision feedback equalizer (DFE) having DFE slices. The DFE slices include a number of data comparators to provide data information based on the sampling of the input signal, and a number of phase error comparators to provide phase error information associated with the sampling of the input signal. The number of phase error comparators of the DFE slices is not greater than the number of data comparators of the DFE slices.

17 Claims, 8 Drawing Sheets

| PHASE SAMPLE | PHASE ERROR INFORMATION | REFERENCE VOLTAGE | 1st TAP | VALID BIT PATTERN | | |
|---|---|---|---|---|---|---|
| | | | | PREVIOUS BIT | PRESENT BIT | NEXT BIT |
| 0° | Err$_0$ | −V$_R$ | −H1 | 1 | 0 | 0 |
| 90° | Err$_{90}$ | +V$_R$ | +H1 | 0 | 1 | 1 |
| 180° | Err$_{180}$ | +V$_R$ | +H1 | 0 | 1 | 1 |
| 270° | Err$_{270}$ | −V$_R$ | −H1 | 1 | 0 | 0 |

505

506

US 9,374,250 B1

WIRELINE RECEIVER CIRCUITRY HAVING COLLABORATIVE TIMING RECOVERY

TECHNICAL FIELD

Embodiments described herein pertain to data transmission. Some embodiments relate to equalizers and clock data recovery.

BACKGROUND

Many electronic devices or systems, such as computers, tablets, digital televisions, include components (e.g., integrated circuit chips) located on a circuit board. The components may communicate with each other using signals that can carry data. The signals are usually transmitted on conductive lines, such as metal-based traces, on the circuit board. As technology advances, some electrical components may communicate with each other using relatively high frequency (e.g., 2 Gigahertz or higher) signals. Such high frequency signals may be used to transmit data at a relatively high data rate (e.g., 2 Gigabits per second or higher). Some conventional receiver components may be able to receive data at such a high data rate. In some cases, however, such conventional receiver components may suffer from a steep cost in power consumption and area.

DETAILED DESCRIPTION

Figure 1:
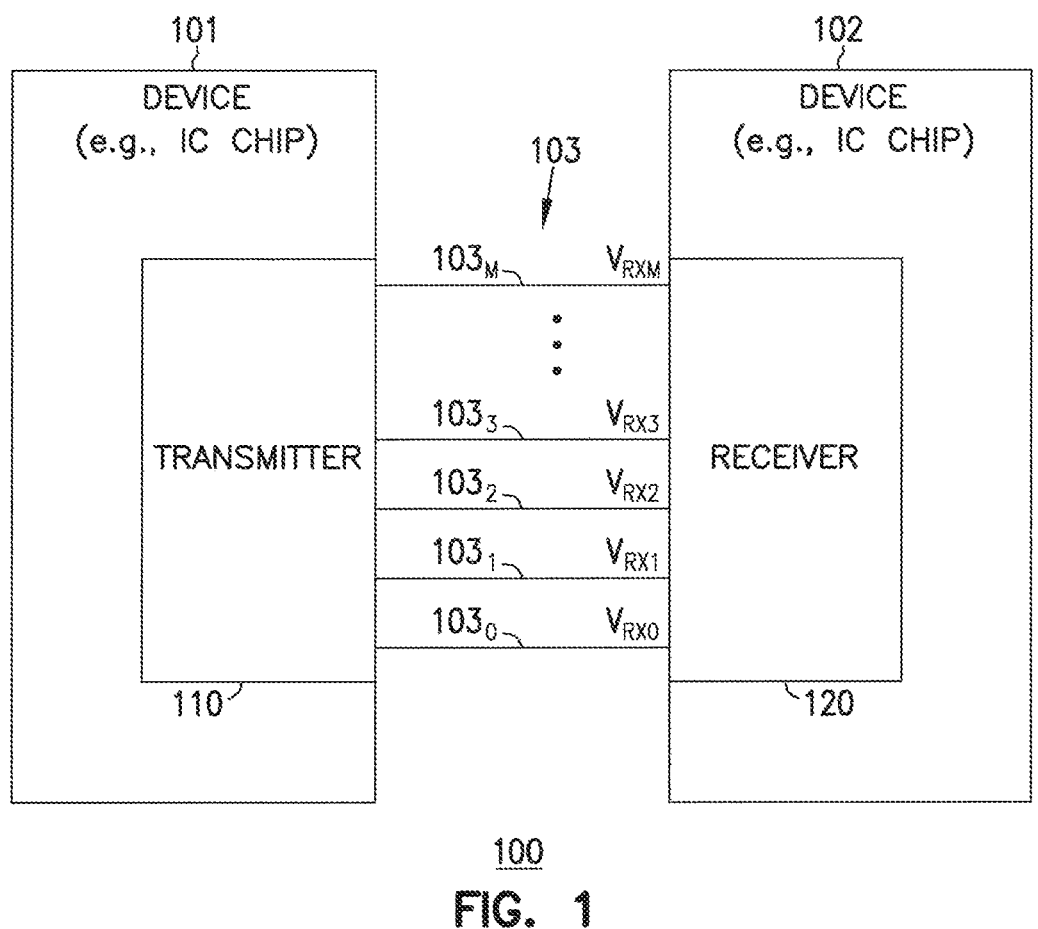
FIG. 1 shows an apparatus including devices and a channel between the devices, according to some embodiments described herein.

FIG. 1 shows an apparatus 100 including devices 101 and 102, and a channel 103 between devices 101 and 102, according to some embodiments described herein. Apparatus 100 can include or be included in an electronic device or system, such as a computer (e.g., server, desktop, laptop, or notebook), a tablet, a cellular phone, or other electronic devices or systems. Each of devices 101 and 102 can include an integrated circuit (IC), such as an IC chip. Devices 101 and 102 can include controllers (e.g., processors, input/output controllers, memory devices, or other electronic devices). As shown in FIG. 1, devices 101 and 102 can include a transmitter 110 and a receiver 120, respectively.

Channel 103 can include lanes $103_0$, $103_1$, $103_2$, and $103_3$ through $103_M$ to conduct signals between devices 101 and 102. Each of lanes $103_0$ through $103_M$ can include conductive traces (e.g., wirelines such as metal-based traces) on a circuit board (e.g., printed circuit board) where devices 101 and 102 are located. Devices 101 and 102 can communicate with each other by providing signals on lanes $103_0$ through $103_M$. As shown in FIG. 1, for example, transmitter 110 may transmit signals $V_{RX0}$, $V_{RX1}$, $V_{RX2}$, and $V_{RX3}$ through $V_{RXM}$ to receiver 120 on lanes $103_0$, $103_1$, $103_2$, and $103_3$ through $103_M$, respectively.

Devices 101 and 102 may communicate with each other using signals at a relatively high frequency that correspond to a relatively high data rate (e.g., up to 32 gigabits per second (Gb/s) or higher per lane). At such a high data rate, inter-symbol interference (ISI) may occur when signals (e.g., $V_{RX0}$ through $V_{RXM}$) transmitted by transmitter 110 arrive at receiver 120. As described in more detail below, receiver 120 employs techniques to accurately receive data at a relatively high data rate while it may operate at a higher speed, consume less power, and have a smaller size in comparison to some conventional receivers.

Receiver 120 can include receivers described below with reference to FIG. 2 through FIG. 8.

Figure 2:
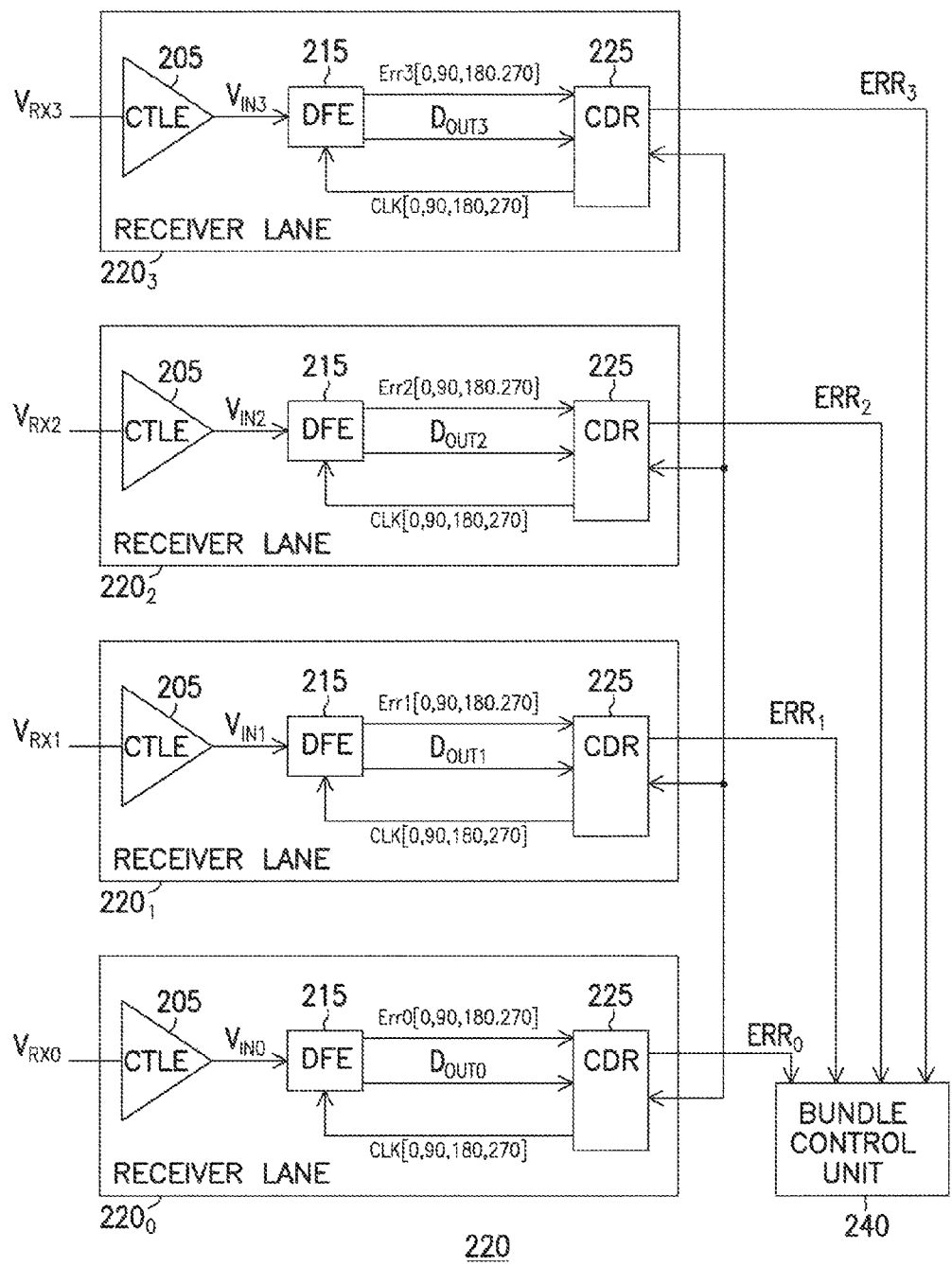
FIG. 2 shows a block diagram of a receiver including receiver lanes and a bundle control unit, according to some embodiments described herein.

FIG. 2 shows a block diagram of a receiver 220 including receiver lanes $220_0$, $220_1$, $220_2$, and $220_3$ and a bundle control unit 240, according to some embodiments described herein. Receiver 220 can correspond to receiver 120 of FIG. 1. Signals $V_{RX0}$, $V_{RX1}$, $V_{RX2}$, and $V_{RX3}$ in FIG. 2 can be transmitted to receiver 220 by a transmitter (e.g., transmitter 110 of FIG. 1) through separate lanes (e.g., lanes $103_0$, $103_1$, $103_2$, and $103_3$) of a channel (e.g., channel 103 of FIG. 1). Each of lanes $103_0$, $103_1$, $103_2$, and $103_3$ can include one or more conductive lines, such as metal-based traces, on a circuit board. FIG. 2 shows an example where receiver 220 includes four receiver lanes $220_0$, $220_1$, $220_2$, and $220_3$. The number of receiver lanes may vary.

As shown in FIG. 2, each of receiver lanes $220_0$, $220_1$, $220_2$, and $220_3$ can include a continuous-time linear equalizer (CTLE) 205, a DFE 215, and a clock and data recovery (CDR) loop 225. For simplicity, the following description describes mainly the operation of receiver lane $220_0$. Other receiver lanes $220_1$, $220_2$, and $220_3$ can have a similar operation.

CTLE 205 in receiver lane $220_0$ can operate to receive signal $V_{RX0}$ and generate signal (e.g., input signal) $V_{IN0}$. DFE 215 can operate to sample signal $V_{IN0}$ based on timing (e.g., phases) of different clock signals CLK[0, 90, 180, 270], which include four different out-of-phase clock signals (e.g., quadrature clocks) $CLK_0$, $CLK_{90}$, $CLK_{180}$, and $CLK_{270}$. DFE 215 can operate to provide data information $D_{OUT0}$ based on the sampling of signal $V_{IN0}$. DFE 215 can also provide phase error information $Err0_0$, $Err0_{90}$, $Err0_{180}$, $Err0_{270}$ (also expressed as Err0[0, 90, 180, 270] in FIG. 2) based on the same sampling of signal $V_{IN0}$ that provides data information $D_{OUT0}$. DFE 215 may include multiple DFE slices. Each of error information Err0[0, 90, 180, 270] can be provided by one of the DFE slices. Phase error information Err0[0, 90, 180, 270] and data information $D_{OUT0}$ can be provided to CDR loop 225. CDR loop 225 can operate to generate phase error information $ERR_0$ based on Err0[0, 90, 180, 270]. Other receiver lanes $220_1$, $220_2$, and $220_3$ can also sample signals $V_{IN1}$, $V_{IN2}$, and $V_{IN3}$, respectively, based on timing of clock signals CLK[0, 90, 180, 270]. Based on these samplings, receiver lanes $220_1$, $220_2$, and $220_3$ can provide corresponding phase error information Err1[0, 90, 180, 270], Err2[0, 90, 180, 270], and Err3[0, 90, 180, 270], and $Err_3$, and data information $D_{OUT1}$, $D_{OUT2}$, and $D_{OUT3}$, and phase error information $ERR_0$, $ERR_1$, $ERR_2$, and $ERR_3$.

Bundle control unit 240 can operate to combine phase error information $ERR_0$, $ERR_1$, $ERR_2$, and $ERR_3$ and generate control information $CTL_{BUNDLE}$, and then provide it to CDR loop 225 in each of receiver lanes $220_0$, $220_1$, $220_2$, and $220_3$. Based on control information $CTL_{BUNDLE}$, receiver lanes $220_0$, $220_1$, $220_2$, and $220_3$ can perform a collaborative clock and data recovery operation. This operation can control (e.g., adjust) the timing (e.g., phases) of clock signals CLK[0, 90, 180, 270] in order to improve the accuracy in the sampling of signals $V_{IN0}$, $V_{IN1}$, $V_{IN2}$, or $V_{IN3}$, as described in more detail below with reference to FIG. 6.

Figure 3:
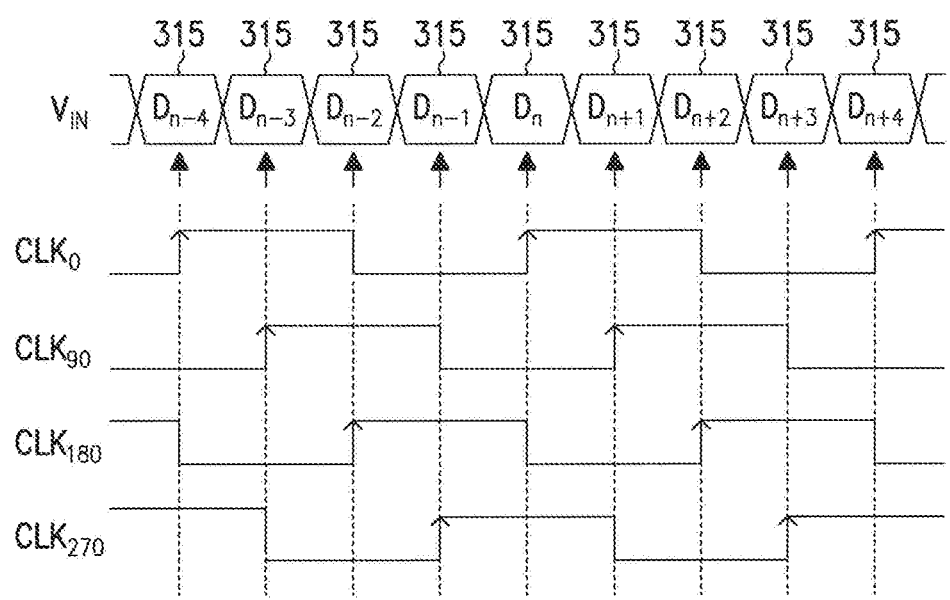
FIG. 3 is a timing diagram for clock signals that can correspond to clock signals of FIG. 2, according to some embodiments described herein.

FIG. 3 is a timing diagram for clock signals $CLK_0$, $CLK_{90}$, $CLK_{180}$, and $CLK_{270}$ that can correspond to clock signals CLK[0, 90, 180, 270] of FIG. 2. As shown in FIG. 3, signal $V_{IN}$ can include symbols 315; each of symbols 315 can carry a bit of information, such as bits $D_{n-4}$ through $D_{n+4}$, which can also be expressed as bits D[n−4:n+4]. Signal $V_{IN}$ can correspond to one of signals $V_{IN0}$, $V_{IN1}$, $V_{IN2}$, and $V_{IN3}$ at the input of DFE 215 in one of receiver lanes $220_0$, $220_1$, $220_2$, and $220_3$ of FIG. 2. Thus, each of data information $D_{OUT0}$, $D_{OUT1}$, $D_{OUT2}$, and $D_{OUT3}$ at the output of DFE 215 in FIG. 2 can include bits similar to bits $D_{n-4}$ through $D_{n+4}$ in FIG. 3.

As shown in FIG. 3, clock signals $CLK_0$, $CLK_{90}$, $CLK_{180}$, and $CLK_{270}$ are 90 degrees out of phase from one clock signal to the next. Signal $V_{IN}$ can be sampled by clock signals $CLK_0$, $CLK_{90}$, $CLK_{180}$, and $CLK_{270}$ such that four symbols (e.g., four bits) 315 can be sampled in one period of each of clock signals $CLK_0$, $CLK_{90}$, $CLK_{180}$, and $CLK_{270}$. Bits $D_{n-4}$ through $D_{n+4}$ can be sequentially sampled in the order shown in FIG. 3. For example, if bit $D_n$ is presently being sampled, then bit $D_{n-1}$ is the previous bit (sampled before bit $D_n$ is sampled) and bit $D_{n+1}$ is the next bit (sampled after bit $D_n$ is sampled). In another example, if bit $D_{n-3}$ is presently being sampled, then bit $D_{n-4}$ is the previous bit (sampled before bit $D_{n-3}$ is sampled) and bit $D_{n-2}$ is the next bit (sampled after bit $D_{n-3}$ is sampled).

Each of bits $D_{n-4}$ through $D_{n+4}$ can have a value, such as binary "1" or "0". As described in detail below with reference to FIG. 4 and FIG. 5, DFE 215 in each of receiver lanes $220_0$, $220_1$, $220_2$, and $220_3$ (FIG. 2) employs a conditional phase detection technique to generate phase error information $Err_0$, $Err_1$, $Err_2$, and $Err_3$ based on the values of three consecutive bits of an input signal, such as three consecutive bits among bits $D_{n-4}$ through $D_{n+4}$ of signal $V_{IN}$.

Figure 4:
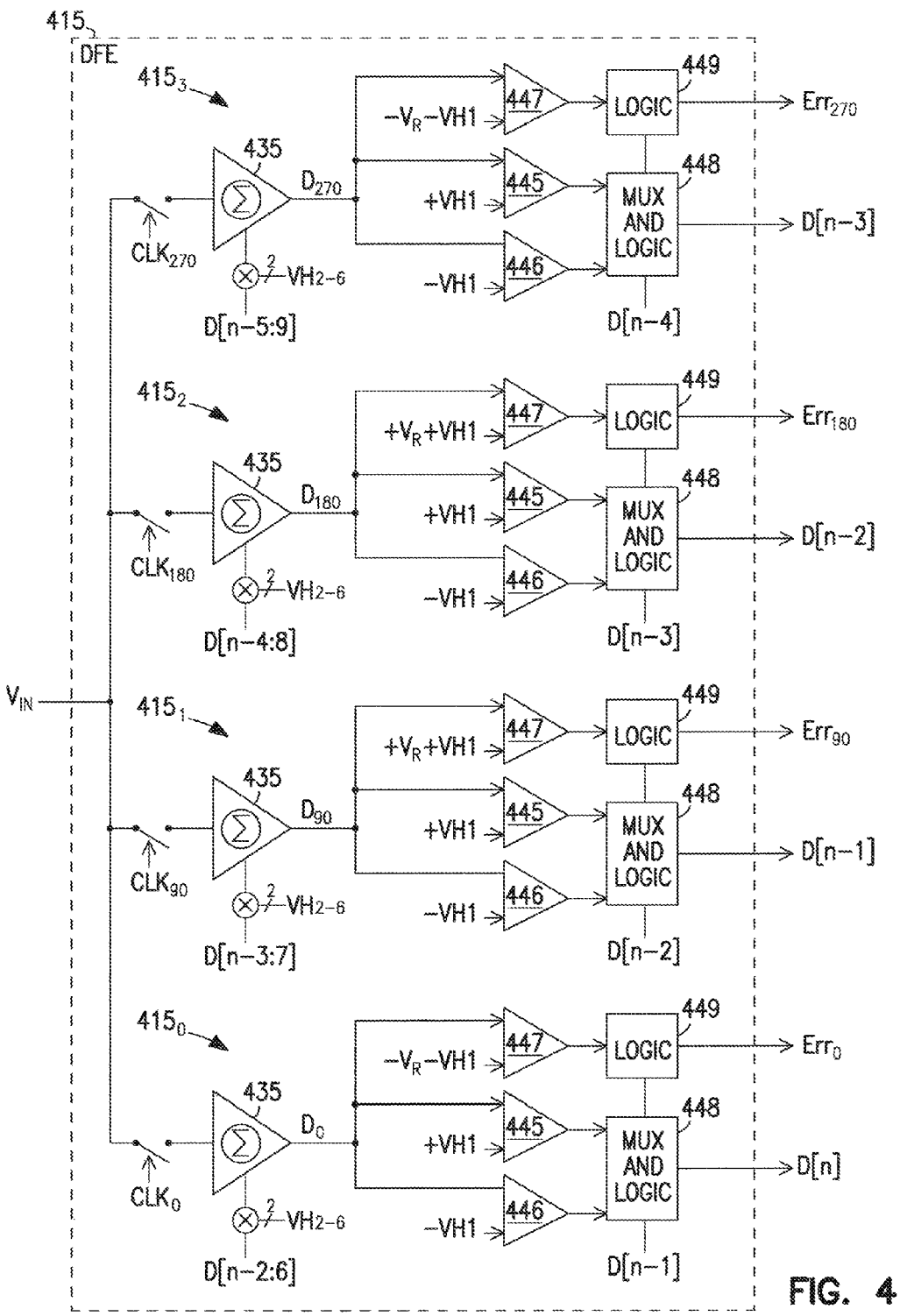
FIG. 4 shows a block diagram of a decision feedback equalizer (DFE) including DFE slices, according to some embodiments described herein.

FIG. 4 shows a block diagram of a DFE 415 including DFE slices (e.g., DFE circuit portions) $415_0$, $415_1$, $415_2$, and $415_3$, according to some embodiments described herein. DFE 415 can correspond to DFE 215 in each of receiver lanes $220_0$, $220_1$, $220_2$, and $220_3$ of FIG. 2.

In FIG. 4, DFE 415 can operate to sample signal $V_{IN}$ to provide data information (e.g., bits) D[n], D[n−1], D[n−2], and D[n−3] and phase error information $Err_0$, $Err_{90}$, $Err_{180}$, and $Err_{270}$ based on the timing of clock signals $CLK_0$, $CLK_{90}$, $CLK_{180}$, and $CLK_{270}$. Signal $V_{IN}$ can correspond to the input signal (e.g., one of signals $V_{IN0}$, $V_{IN1}$, $V_{IN2}$, and $V_{IN3}$) at the input of DFE 215 of one of receiver lanes $220_0$, $220_1$, $220_2$, and $220_3$ of FIG. 2. The combination of data information D[n], D[n−1], D[n−2], and D[n−3] can correspond to data information (e.g., one of data information $D_{OUT0}$, $D_{OUT1}$, $D_{OUT2}$, and $D_{OUT}$) at the output of DFE 215 of one of receiver lanes $220_0$, $220_1$, $220_2$, and $220_3$ of FIG. 2. Phase error information $Err_0$, $Err_{90}$, $Err_{180}$, and $Err_{270}$ can correspond to phase error information (e.g., Err0[0, 90, 180, 270]) at the output of DFE 215 of one of receiver lanes $220_0$, $220_1$, $220_2$, and $220_3$ of FIG. 2. Clock signals $CLK_0$, $CLK_{90}$, $CLK_{180}$, and $CLK_{270}$ can correspond to the clock signals shown in FIG. 3.

As shown in FIG. 4, DFE slices $415_0$, $415_1$, $415_2$, and $415_3$ can be arranged in a four-way interleaved DFE slices. Signal $V_{IN}$ (which is the input signal to DFE slices $415_0$, $415_1$, $415_2$, and $415_3$) can be sampled by a passive track-and-hold based on timing of clock signals $CLK_0$, $CLK_{90}$, $CLK_{180}$, and $CLK_{270}$. Each of DFE slices $415_0$, $415_1$, $415_2$, and $415_3$ can include a summer 435 that can operate to reduce or cancel inter-symbol interference (ISI) from $2^{nd}$ to $6^{th}$ post-cursor taps (associated with data information D[n−2:6], D[n−3:7], D[n−4:8], and D[n−5:9], and tap values VH2-6). Speculation is used in DFE 215 to relax the critical timing of the first tap. Baud-rate phase detector for CDR loop (e.g., CDR loop 225 in FIG. 2) is included with 1-tap speculation.

As shown in FIG. 4, each of DFE slices $415_0$, $415_1$, $415_2$, and $415_3$ can include two data comparators 445 and 446, a phase error comparator 447, multiplexer and logic circuitry 448, and logic circuitry 449. Thus, DFE 415 can include a total of four phase error comparators (one phase comparator 447 in each of DFE slices $415_0$, $415_1$, $415_2$, and $415_3$) and a total of eight data comparators (two data comparators 445 and 446 in each of DFE slices $415_0$, $415_1$, $415_2$, and $415_3$). Therefore, the total number of phase error comparators (e.g., four) of DFE 415 is not greater than the total number of data comparators (eight).

For simplicity, the following description describes mainly the operation of DFE slice $415_0$. Other DFE slices $415_1$, $415_2$, and $415_3$ can have a similar operation. In DFE slices $415_0$, one input of each of data comparators 445 and 446 can receive signal $D_0$ from the output of summer 435. Signal $D_0$ can include data information (bits) from sampling signal $V_{IN}$ using clock signal $CLK_0$. The other input of each of data comparators 445 and 446 can receive either a signal +VH1 (e.g., a correction signal) or a signal −VH1 (e.g., another correction signal). Data comparators 445 and 446 can operate to determine whether the value of signal $D_0$ is above the level of signal +VH1 or below the level of signal −VH1. Based on the comparison operation performed by comparators 445 and 446 and the value of a previous data information (e.g., previous bit D[n−1] sampled by another DFE slice, such as DFE slice $415_1$), multiplexer and logic circuitry 448 in DFE slice $415_0$ can determine whether the bit included in signal $D_0$ presently being sampled by DFE slice $415_0$ has a value of "1" or "0". Multiplexer and logic circuitry 448 provides sampled data information at its output as data information D[n]. Data information D[n] can be provided to another component (not shown) of a receiver (that includes DFE 415) for further processing. Data information D[n] can also be provided to a CDR loop (e.g., CDR loop 225 of FIG. 2) of the receiver that includes DFE 415. The CDR loop may operate to generate control information based on data information D[n] and phase error information $Err_0$, $Err_{90}$, $Err_{180}$, and $Err_{270}$.

Phase error information $Err_0$ can be provided by phase error comparator 447 and logic circuitry 449 of DFE slices $415_0$. As shown in FIG. 4, phase error comparator 447 can include an input to receive signal $D_0$ from the output of summer 435 and another input to receive a signal −$V_R$−VH1. $V_R$ is a reference voltage. VH1 is a first tap coefficient voltage. Phase error comparator 447 generates phase error information $Err_0$ based on the comparison between signal $D_0$ and the value of signal −$V_R$−VH1. Based on the result of the comparison performed by phase error comparator 447, logic circuitry 449 can provide phase error information $Err_0$, which can have a value of either "1" or "0".

Other DFE slices $415_1$, $415_2$, and $415_3$ can provide data information D[n−1], D[n−2], and D[n−3] and phase error information $Err_{90}$, $Err_{180}$, and $Err_{270}$. For example, DFE slice $415_1$ can provide data information D[n−1] based on signal $D_{90}$ and previous data information D[n−2], and phase error information $Err_{90}$ based on signal $D_{90}$ and signal $+V_R+VH1$. DFE slice $415_2$ can provide data information D[n−2] based on signal $D_{180}$ and previous data information D[n−2], and phase error information $Err_{180}$ based on signal $D_{180}$ and signal$+V_R+$VH. DFE slice 415 can provide data information D[n−3] based on previous data information D[n−4], and phase error information $Err_{270}$ based on the signal at the output of summer 435 and signal $-V_R-VH1$.

As shown in FIG. 4, since each of DFE slices $415_0$, $415_1$, $415_2$, and $415_3$ may include only one phase error comparator 447 to perform phase error detection, the thresholds for phase error comparator 447 of each of DFE slices $415_0$, $415_1$, $415_2$, and $415_3$ can be chosen in such a way that a 1-to-0 or 0-to-1 bit transition can be detected. To ensure only strong 1-to-0 and 0-to-1 bit transitions are detected (for improved detection accuracy) a filtering is employed in the CDR so that the phase error information (e.g., $Err_0$, $Err_{90}$, $Err_{180}$, and $Err_{270}$) can be considered to be valid or invalid only when the phase error information is obtained based on detection of bits having specific bit patterns (e.g., 011 and 100). Detection of such specific bit patterns (e.g., 011 and 100) in the filtering technique described herein is referred to as conditional phase detection.

In the conditional phase detection, phase error information obtained from a 1-to-0 transition is considered valid and passed to the digital domain only when a next bit (among three consecutive bits) following the 1-to-0 bit transition is a "0" bit (e.g., bit pattern 100). Similarly, in the conditional phase detection, phase error information obtained from a 0-to-1 transition is considered valid and passed to the digital domain only when a next bit (among three consecutive bits) following the 0-to-1 bit transition is a "0" bit (e.g., bit pattern 011).

The conditional phase detection described above may yield approximately 25% of the total phase detection. However, as described below, the receiver having a DFE (e.g., DFE 415) described herein employs a collaborative clock and data recovery technique, such that full phase detection may also be achieved with a reduced complexity.

DFE 415 in FIG. 4 may include fewer comparators in comparison with a similar conventional DFE. For example, a conventional DFE having multiple DFE slices may include four phase error comparators in each of the multiple DFE slices (e.g., 16 phase error comparators in four DFE slices). In contrast, as shown in FIG. 4, each of DFE slices $415_0$, $415_1$, $415_2$, and $415_3$ may include only one phase error comparator 447 for a total of four phase error comparators in four DFE slices. The reduced number of phase error comparators in DFE 415 may allow the receiver (e.g., receiver 120 of FIG. 1 or 220 of FIG. 2) that includes DFE 415 to have a reduced complexity in comparison with a conventional receiver (e.g., a receiver having a DFE with four DFE slices that use full phase detection in the front-end in each of the four DFE slices). Further, having a reduced number of phase error comparators (e.g., 75% less than some conventional DFEs) in DFE 415 may enable power and area reduction in DFE 415. The maximum achievable data rate may also be improved because vertical routing distances may be cut in half.

Figures 5A, 5B:
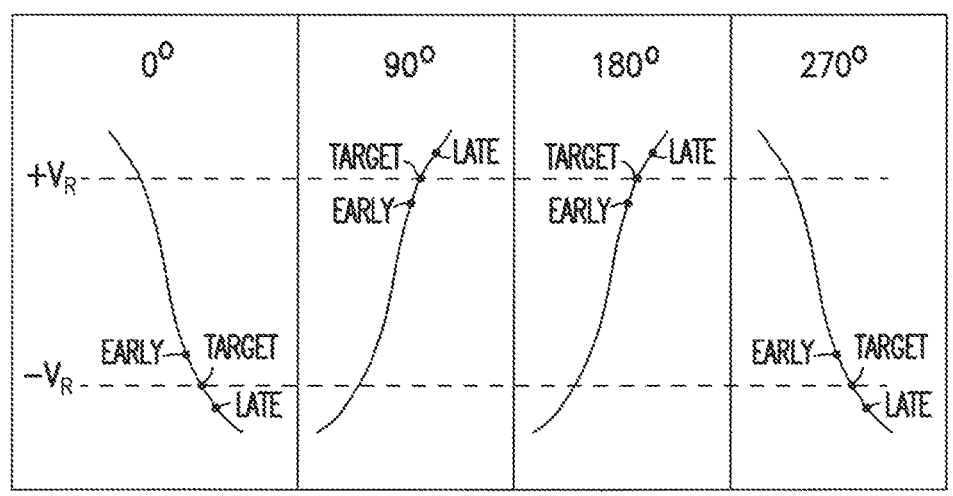
FIG. 5A and FIG. 5B show charts including information for implementing conditional phase detection in the DFE of FIG. 4, according to some embodiments described herein.

FIG. 5A and FIG. 5B show charts 505 and 506 including information for implementing conditional phase detection in DFE 415 of FIG. 4, according to some embodiments described herein. In FIG. 5, phase samples 0°, 90°, 180°, and 270° correspond to clocks signals $CLK_0$, $CLK_{90}$, $CLK_{180}$, and $CLK_{270}$ used to sample signal $V_{IN}$ (FIG. 4) in order to provide corresponding error information $Err_0$, $Err_{90}$, $Err_{180}$, and $Err_{270}$. Valid bit pattern (previous bit, present bit, and next bit) shows specific values (e.g., 100 or 011) of three consecutive bits (included in signal $V_{IN}$) in order for each of phase error information $Err_0$, $Err_{90}$, $Err_{180}$, and $Err_{270}$ to be considered valid.

For example, in chart 505 of FIG. 5A, phase error information $Err_0$ (generated based on the transition between bits $D_{n-1}$ and $D_n$) is valid only if three consecutive bits $D_{n-1}$, $D_n$, $D_{n+1}$ of signal $V_{IN}$ have values of "1", "0", and "0", respectively. Phase error information $Err_{90}$ (generated based on the transition between bits $D_{n-2}$ and $D_{n-1}$) is valid only if three consecutive bits $D_{n-2}$, $D_{n-1}$, $D_n$ of signal $V_{IN}$ have values of "0", "1", and "1", respectively. Phase error information $Err_{180}$ (generated based on the transition between bits $D_{n-3}$ and $D_{n-2}$) is valid only if three consecutive bits $D_{n-3}$, $D_{n-2}$, $D_{n-1}$ of signal $V_{IN}$ have values of "0", "1", and "1", respectively. Phase error information $Err_{270}$ (generated based on the transition between bits $D_{n-4}$ and $D_{n-3}$) is valid only if three consecutive bits $D_{n-4}$, $D_{n-3}$, $D_{n-2}$ of signal $V_{IN}$ have values of "1", "0", and "0", respectively.

In chart 505, reference voltages $-V_R$, $+V_R$, and tap values of the first tap of DFE 415 are values provided to the inputs of a corresponding phase error comparator 447 of each of DFE slices $415_0$, $415_1$, $415_2$, and $415_3$.

Chart 506 in FIG. 5B shows target sampling points associated with clock signals $CLK_0$, $CLK_{90}$, $CLK_{180}$, and $CLK_{270}$. The points associated with "early" or "late" indicate whether a corresponding clock signal (one of clock signals $CLK_0$, $CLK_{90}$, $CLK_{180}$, and $CLK_{270}$) used to sample the input signal (e.g., signal $V_{IN}$ in FIG. 3) occur before or after, respectively, a target sampling point. The values of each of phase error information $Err_0$, $Err_{90}$, $Err_{180}$, and $Err_{270}$ can indicate whether the corresponding clock signals (one of clock signals $CLK_0$, $CLK_{90}$, $CLK_{180}$, and $CLK_{270}$) occurs before or after, respectively, the target sampling point. For example, phase error information $Err_0$ may have one value (e.g., "1") to indicate that clock signal $CLK_0$ is early relative to the target sampling point, and another value (e.g., "0") to indicate that clock signal $CLK_0$ is late relative to the target sampling point. Similarly, each of phase error information $Err_{90}$, $Err_{180}$, and $Err_{270}$ can have one value (e.g., "1") to indicate a corresponding clock signal (e.g., one of clock signals $CLK_{90}$, $CLK_{180}$, and $CLK_{270}$) is early relative to the target sampling point, and another value (e.g., "0") to indicate that a corresponding clock signal is late relative to the target sampling point. Based on the values of phase error information $Err_0$, $Err_{90}$, $Err_{180}$, and $Err_{270}$ the phases of clock signals $CLK_0$, $CLK_{90}$, $CLK_{180}$, and $CLK_{270}$ can be adjusted, such as by moving their phases to the right or left in order to align them with the target sampling points.

Figure 6:
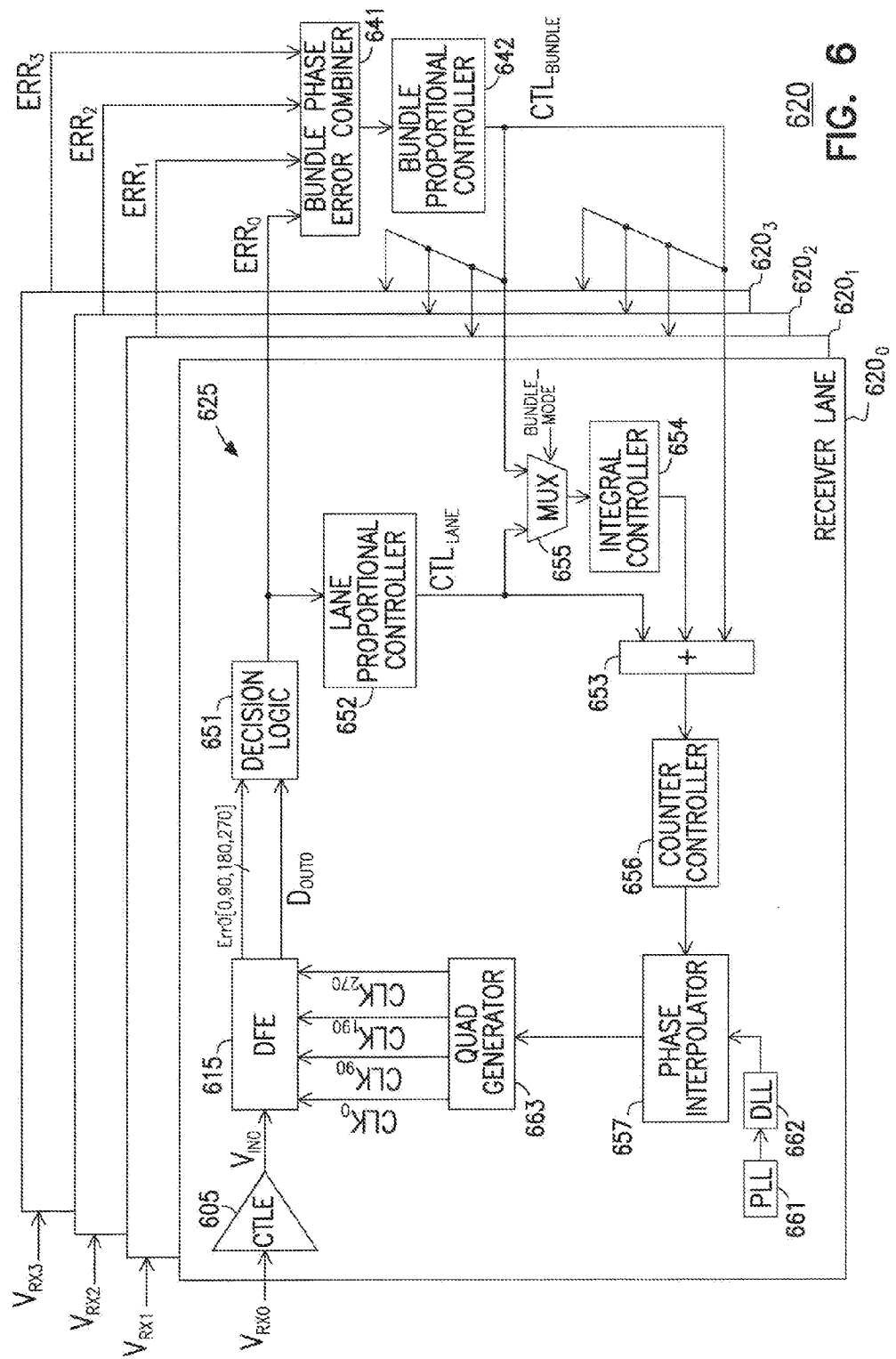
FIG. 6 shows a block diagram of a receiver that employs a collaborative clock and data recovery technique, according to some embodiments described herein.

FIG. 6 shows a block diagram of a receiver 620 that employs a collaborative clock and data recovery technique, according to some embodiments described herein. Receiver 620 can correspond to receive 120 of FIG. 1 or receiver 220 of FIG. 2. For example, receiver 620 can include receiver lanes $620_0$, $620_1$, $620_2$, and $620_3$ that can correspond to receiver lanes $220_0$, $220_1$, $220_2$, and $220_3$ of FIG. 2. Receiver lanes $620_0$, $620_1$, $620_2$, and $620_3$ can include similar or identical components. However, for simplicity, circuit components of only receiver lane $620_0$ are shown in FIG. 6. Receiver 620 can also include a bundle phase error combiner 641 and a bundle proportional controller 642 that can be parts of a bundle control unit, such as bundle control unit 240 of FIG. 2.

Bundle phase error combiner 641 and a bundle proportional controller 642 can operate to combine phase error information $ERR_0$, $ERR_1$, $ERR_2$, and $ERR_3$ from receiver lanes $620_0$, $620_1$, $620_2$, and $620_3$ and provide control information $CTL_{BUNDLE}$ to each of each of receiver lanes $620_0$, $620_1$, $620_2$, and $620_3$. The value of control information $CTL_{BUNDLE}$ is based on the value at the output of bundle phase error combiner 641. For example, bundle phase error combiner 641 may select a value of a majority of phase error information $ERR_0$, $ERR_1$, $ERR_2$, and $ERR_3$ to be the output value that is provided to bundle proportional controller 642.

Each of receiver lanes $620_0$, $620_1$, $620_2$, and $620_3$ can include a CDR loop 625. CDR loop 625 can operate in different modes to control (e.g., adjust) the timing of clock signals $CLK_0$, $CLK_{90}$, $CLK_{180}$, and $CLK_{270}$ based on different control information. The modes can be selected based on a signal (e.g., mode select signal) Bundle_Mode. For example, in one mode, CDR loop 625 can control the timing of clock signals $CLK_0$, $CLK_{90}$, $CLK_{180}$, and $CLK_{270}$ based on control information $CTL_{BUNDLE}$. In another mode, CDR loop 625 can control the timing of clock signals $CLK_0$, $CLK_{90}$, $CLK_{180}$, and $CLK_{270}$ based on control information $CTL_{LANE}$ without using control information $CTL_{BUNDLE}$. Control information $CTL_{LANE}$ is generated by a lane proportional controller 652 based on a corresponding phase error information (e.g., one of $ERR_0$, $ERR_1$, $ERR_2$, and $ERR_3$) in the corresponding receiver lane.

As shown in FIG. 4, receiver lanes $220_0$, $220_1$, $220_2$, and $220_3$ are bundled together to generate aggregate (e.g., bundled) phase error information that is used to drive the CDR integral control in each lane. Proportional control is maintained per receiver lane and can be set to remove per-lane skew. Four receiver lanes bundling results in full phase error information for each receiver lane CDR, restoring performance to that of a receiver using full phase detection in the front-end.

For simplicity, the following description describes mainly the operation of receiver lane $620_0$. Other receiver lanes $620_1$, $620_2$, and $620_3$ can have a similar operation. The multiple modes of operation of CDR loop 625 are described after the description of the operation of receiver lane $620_0$.

As shown in FIG. 6, receiver lane $620_0$ can include a CTLE 605 and a DFE 615. CTLE 605 can operate to receive signal $V_{RX0}$ and generate signal $V_{IN0}$. DFE 615 can include DFE 415 of FIG. 4. DFE 615 can sample signal $V_{IN0}$ based on timing of clock signals $CLK_0$, $CLK_{90}$, $CLK_{180}$, and $CLK_{270}$ and provide data information $D_{OUT0}$ and phase error information $Err0_0$, $Err0_{90}$, $Err0_{180}$, and $Err0_{270}$ (shown as Err0[0, 90, 180, and 270]). Data information $D_{OUT0}$ includes a combination of data information output from four DFE slices of DFE 615. For example, DFE 615 can include DFE 415 (FIG. 4) such that data information $D_{OUT0}$ of DFE 615 can include data information D[n−3], D[n−2], D[n−1], and D[n] from the output of four DFE slices (e.g., $415_0$, $415_1$, $415_2$, and $415_3$). As described above, phase error information $Err0_0$, $Err0_{90}$, $Err0_{180}$, and $Err0_{270}$ can be valid or invalid based on the conditional phase detection technique described above with reference to chart 505 (FIG. 5) and chart 506 (FIG. 6).

In FIG. 6, decision logic 651 can determine whether phase error information $Err0_0$, $Err0_{90}$, $Err0_{180}$, and $Err0_{270}$ is valid or invalid based on bit patterns (e.g., 100 or 011) in charts 505 (FIG. 5A). For example, decision logic 651 may examine the values of data information $D_{OUT0}$ (e.g., D[n−3], D[n−2], D[n−1], and D[n]) provided by DFE 615. Based on the values of information $D_{OUT0}$, decision logic 651 can determine whether each of phase error information $Err0_0$, $Err0_{90}$, $Err0_{180}$, and $Err0_{270}$ is generated based on bit pattern (100 or 011) of data information $D_{OUT0}$. Decision logic 651 may update phase error information $ERR_0$ depending on whether each of phase error information $Err0_0$, $Err0_{90}$, $Err0_{180}$, and $Err0_{270}$ (or alternatively, a majority of phase error information $Err0_0$, $Err0_{90}$, $Err0_{180}$, and $Err0_{270}$) is valid.

If each of phase error information $Err0_0$, $Err0_{90}$, $Err0_{180}$, and $Err0_{270}$ (or alternatively, a majority of phase error information $Err0_0$, $Err0_{90}$, $Err0_{180}$, and $Err0_{270}$) is determined to be valid, then decision logic 651 may calculate the value for phase error information $ERR_0$ based on the values of phase error information $Err0_0$, $Err0_{90}$, $Err0_{180}$, and $Err0_{270}$. As an example, decision logic 651 may select the value of the majority of phase error information $Err0_0$, $Err0_{90}$, $Err0_{180}$, and $Err0_{270}$ to be the value for phase error information $Err0$ and provide it to lane proportional controller 652 and bundle phase error combiner 641.

If each of phase error information $Err0_0$, $Err0_{90}$, $Err0_{180}$, and $Err0_{270}$ (or alternatively, a majority of phase error information $Err0_0$, $Err0_{90}$, $Err0_{180}$, and $Err0_{270}$) is determined to be invalid (e.g., not generated based on bit pattern 100 or 011), then decision logic 651 may mask phase error information $Err0_0$, $Err0_{90}$, $Err0_{180}$, and $Err0_{270}$ from lane proportional controller 652 and bundle phase error combiner 641. This means that the values of phase error information $Err0_0$, $Err0_{90}$, $Err0_{180}$, and $Err0_{270}$ may not be used in the next calculation for the value for phase error information $ERR_0$. Thus, the present value of phase error information $ERR_0$ may remain the same (e.g., not to be updated with another (e.g., new) value).

Other receiver lanes $620_1$, $620_2$, and $620_3$ can also receive corresponding signals $V_{RX1}$, $V_{RX2}$, and $V_{RX3}$ and generate signals $V_{IN1}$, $V_{IN2}$, and $V_{IN3}$ (not shown). DFE and decision logic of each of receiver lanes $620_1$, $620_2$, and $620_3$ (similar to DFE 615 and decision logic 651 of receiver lane $620_0$) can operate to provide phase error information $ERR_1$, $ERR_2$, and $ERR_3$, respectively.

The value of phase error information $ERR_0$, $ERR_1$, $ERR_2$, and $ERR_3$, may indicate an adjustment direction (e.g., decrement or increment) of control information (e.g., proportional control and integral control) provided by CDR loop 625.

As described above, CDR loop 625 in each of receiver lanes $620_0$, $620_1$, $620_2$, and $620_3$ can operate in different modes based on different control information to control the timing of clock signals $CLK_0$, $CLK_{90}$, $CLK_{180}$, and $CLK_{270}$. For example, CDR loop 625 can operate in one mode (e.g., collaborative mode (or multilane-based mode)) when signal Bundle_Mode has one value (e.g., high) and another mode (e.g., non-collaborative mode (or lane-based mode) when signal Bundle_Mode has another value (e.g., low). In either mode, phase error information $ERR_0$, $ERR_1$, $ERR_2$, and $ERR_3$ are used by CDR loop 625 (e.g., used separately in a lane-based mode or used in combination (collaboratively) in the multilane-based mode).

In a collaborative mode, signal Bundle_Mode can cause a selector, such as a multiplexer 655, to select control information $CTL_{BUNDLE}$ from the output of bundle proportional controller 642. In this mode, integral controller 654 can receive control information $CTL_{BUNDLE}$ (through multiplexer 655) and use it to track the frequency of clock signals $CLK_0$, $CLK_{90}$, $CLK_{180}$, and $CLK_{270}$. The output of integral controller 654 is provided to an input of an adder 653. Control information $CTL_{BUNDLE}$ can also be provided to another input of adder 653 to track the phases of clock signals $CLK_0$, $CLK_{90}$, $CLK_{180}$, and $CLK_{270}$. Control information $CTL_{LANE}$ is also provided to an input of adder 653. However, in the collaborative mode, control information $CTL_{LANE}$ may be set to zero. Alternatively, control information $CTL_{LANE}$ may be set to a relatively low value, such that low frequency signals may be tracked. The output of adder 653 is provided to a counter controller 656. The content of counter controller 656 can be updated based on the output from adder 653, which is based on the output of integral controller 654 and control information $CTL_{BUNDLE}$.

A phase interpolator 657 can receive clock signals generated by an arrangement of a phase-locked loop (PLL) 661 and a delay-locked loop (DLL) 662. For example, PLL 661 can generate a pair of clock signals (e.g., complementary clock signals) based on a reference clock signal. DLL 662 can receive the pair of clock signals from PLL 661 and generate four clock signals having four different phases (e.g., phases of 0, 90, 180, and 270 degrees). Phase interpolator 657 can select delays (e.g., fine delay) between 0 and 360 degrees based on output from counter controller 656. Phase interpolator 657 can be controlled by a number of control bits that set the operating range of phase interpolator 657. Counter controller 656 can include a rollover counter that can operate to keep phase interpolator 657 within its operating range.

The output of phase interpolator 657 is provided to quadrature clock generator (QUAD GENERATOR) 663, which can generate clock signals $CLK_0$, $CLK_{90}$, $CLK_{180}$, and $CLK_{270}$ based on the output of phase interpolator 657. DFE 615 uses clock signals $CLK_0$, $CLK_{90}$, $CLK_{180}$, and $CLK_{270}$ to sample an input signal (e.g., $V_{IN0}$), as described above. CDR loop 625 can adaptively update control information $CTL_{BUNDLE}$ to control the timing of clock signals $CLK_0$, $CLK_{90}$, $CLK_{180}$, and $CLK_{270}$ in order to improve accuracy in the sampling of signal $V_{IN0}$ at receiver lane $620_0$. In the collaborative mode, other receiver lanes $620_1$, $620_2$, and $620_3$ can also receive control information $CTL_{LANE}$ and operate in ways similar to that of receiver lane $620_0$ to control the timing of clock signals $CLK_0$, $CLK_{90}$, $CLK_{180}$, and $CLK_{270}$ in each of the other receiver lanes $620_1$, $620_2$, and $620_3$.

In a lane-based mode, signal Bundle_Mode can cause multiplexer 655 to select control information $CTL_{LANE}$ from the output of lane proportional controller 652. In this mode, integral controller 654 can receive control information $CTL_{LANE}$ (through multiplexer 655) and use it to track the frequency of clock signals $CLK_0$, $CLK_{90}$, $CLK_{180}$, and $CLK_{270}$. Control information $CTL_{LANE}$ can also be provided to another input of adder 653 to track the phases of clock signals $CLK_0$, $CLK_{90}$, $CLK_{180}$, and $CLK_{270}$. In the lane-based mode, control information $CTL_{BUNDLE}$ from bundle proportional controller 642 can be disabled (or alternatively set to zero). In the lane-based mode, adder 653, counter controller 656, phase interpolator 657, and quadrature clock generator 663 operate in ways similar to that of the collaborative mode to allow CDR loop 625 to control the timing of clock signals $CLK_0$, $CLK_{90}$, $CLK_{180}$, and $CLK_{270}$ based on control information $CTL_{LANE}$.

As described above, phase error information $ERR_0$ is generated based on a conditional phase detection technique in which only one comparator may be used in the conditional phase detection. Thus, in comparison with a conventional full phase error detection (e.g., a non-conditional phase error detection) phase error information $ERR_0$ may provide only a portion (e.g., 25%) of a full phase error detection information. Thus, in the lane-based mode as described herein, lane proportional controller 652 may cause the loop gain of CDR loop 625 to increase by a factor of four to achieve the full phase to compensate for the loss of phase error information due to a reduced number of phase error comparators (FIG. 1).

Receiver 620 as described above may allow multi-mode operation by seamlessly switching between phase decimation and full phase detection when DFE tap speculation is enabled or disabled, respectively. Receiver 620 may also allow lane characterization without interrupting data transmission when collaborative clock recovery is used. One of the receiver lanes may be taken offline for characterization without impacting receiver performance. Receiver 620 may enable low overhead power scalability with data rate by powering down unused comparators in an interleaved slice, and by decreasing the number of interleaved slices and lowering data rates. This ensures a wide operating range (e.g., from 4 to 32 Gigabits per second) with improved power-efficiency (e.g., below approximately 5.7 pJ/bit in some cases). Receiver 620 may further allow multiple phase detection capabilities, such as baud-rate (full "edge-rate" and quarter "edge-rate") and oversampling to ensure compliance with multiple standards.

Figure 7:
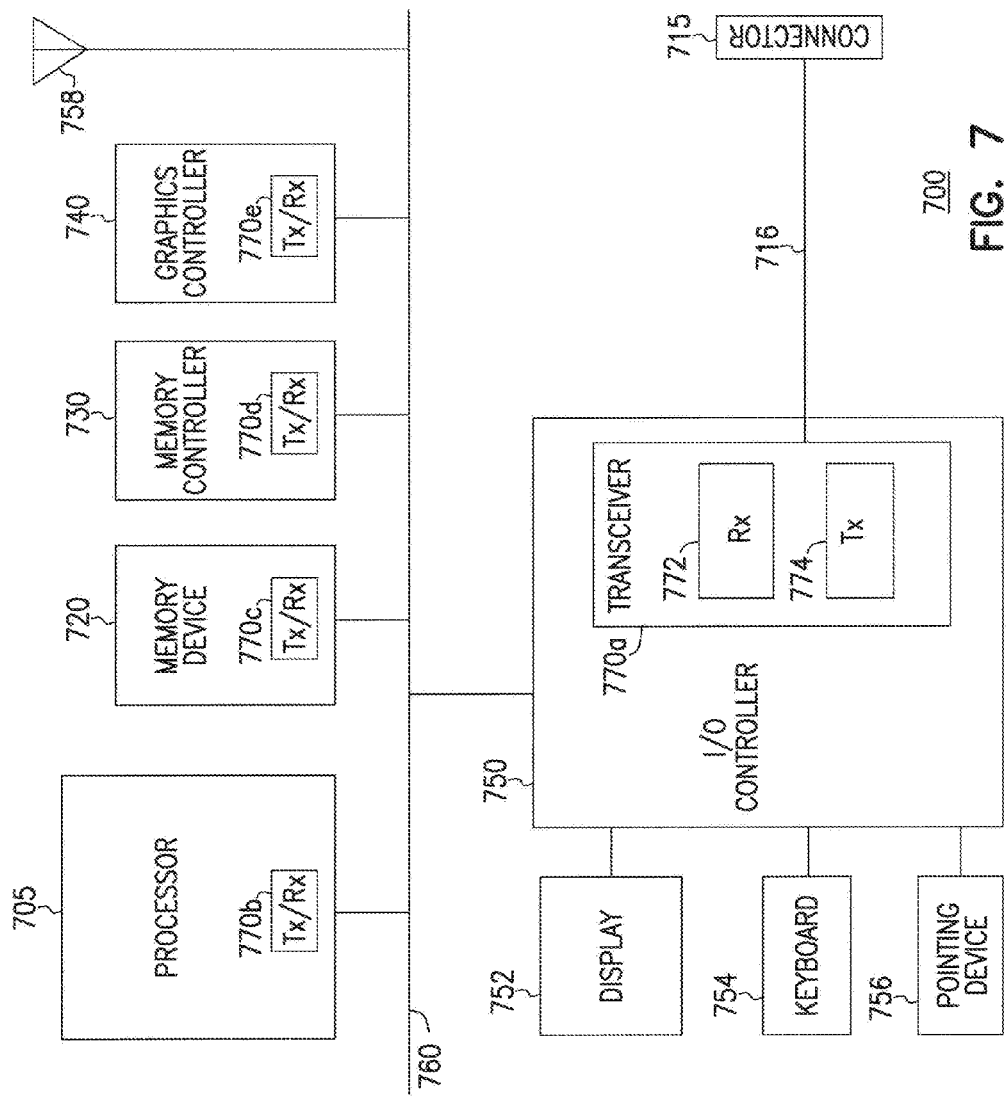
FIG. 7 shows an apparatus in the form of a system (e.g., electronic system), according to some embodiments described herein.

FIG. 7 shows an apparatus in the form of a system (e.g., electronic system) 700, according to some embodiments described herein. System 700 can include or be included in a computer, a tablet, or other electronic systems. As shown in FIG. 7, system 700 can include a processor 705, a memory device 720, a memory controller 730, a graphics controller 740, an input and output (I/O) controller 750, a display 752, a keyboard 754, a pointing device 756, at least one antenna 758, a connector 715, and a bus 760.

Each of processor 705, memory device 720, memory controller 730, graphics controller 740, and I/O controller 750 can include an IC such as device 101 or 102 (FIG. 1).

In some arrangements, system 700 does not have to include a display. Thus, display 752 can be omitted from system 700. In some arrangements, system 700 does not have to include any antenna. Thus, antenna 758 can be omitted from system 700.

Processor 705 may include a general-purpose processor or an application specific integrated circuit (ASIC).

Memory device 720 may include a dynamic random access memory (DRAM) device, a static random access memory (SRAM) device, a flash memory device, or a combination of these memory devices. FIG. 7 shows an example where memory device 720 is a stand-alone memory device separated from processor 705. In an alternative arrangement, memory device 720 and processor 705 can be located on the same die. In such an alternative arrangement, memory device 720 is an embedded memory in processor 705, such as embedded DRAM (eDRAM), embedded SRAM (eSRAM), embedded flash memory, or another type of embedded memory.

Display 752 can include a liquid crystal display (LCD), a touchscreen (e.g., capacitive or resistive touchscreen), or another type of display. Pointing device 756 can include a mouse, a stylus, or another type of pointing device.

I/O controller 750 can include a communication module for wired or wireless communication (e.g., communication through one or more antenna 758). Such wireless communication may include communication in accordance with WiFi communication technique, Long Term Evolution Advanced (LTE-A) communication technique, or other communication techniques.

I/O controller 750 can also include a module to allow system 700 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), and other specifications.

Connector 715 can be arranged (e.g., can include terminals, such as pins) to allow system 700 to be coupled to an external device (or system). This may allow system 700 to communicate (e.g., exchange information) with such a device (or system) through connector 715. Connector 715 may be coupled to I/O controller 750 through a connection 716 (e.g., a bus).

Connector 715, connection 716, and at least a portion of bus 760 can include conductive lines that conform with at least one of USB, DP, HDMI, Thunderbolt, PCIe, and other specifications.

I/O controller 750 can include a transceiver (Tx/Rx) 770*a* having a receiver (Rx) 772 and a transmitter (Tx) 774. Transmitter 774 can operate to transmit information from I/O controller 750 to another part of system 700 or to an external device (or system) coupled to connector 715. Receiver 772 can operate to allow I/O controller 750 to receive information from another part of system 700 or from an external device (or system) coupled to connector 715. Receiver 772 can include any of the receivers described above with reference to FIG. 1 through FIG. 6.

As shown in FIG. 7, processor 705, memory device 720, memory controller 730, and graphics controller 740 can include transceivers 770*b*, 770*c*, 770*d*, and 770*e*, respectively, to allow each of these components to transmit and receive information through their respective transceiver. At least one of transceivers 770*b*, 770*c*, 770*d*, and 770*e* can be similar to or identical to transceiver 770*a*. Thus, at least one of transceivers 770*b*, 770*c*, 770*d*, and 770*e* can include a receiver similar to or identical to receiver 772. For example, at least one of transceivers 770*a*, 770*b*, 770*c*, 770*d*, and 770*e* can include a receiver that can be arranged to allow at least one of processor 705, memory device 720, memory controller 730, and graphics controller 740 to receive information (e.g., signals) from another part of system 700 or from an external device (or system) coupled to connector 715.

FIG. 7 shows the components of system 700 arranged separately from each other as an example. For example, each of processor 705, memory device 720, memory controller 730, graphics controller 740, and I/O controller 750 can be located on a separate die (e.g., semiconductor die or an IC chip). In some arrangements, two or more components (e.g., processor 705, memory device 720, graphics controller 740, and I/O controller 750) of system 700 can be located on the same die (e.g., same IC chip) that forms a system-on-chip (SoC).

Figure 8:
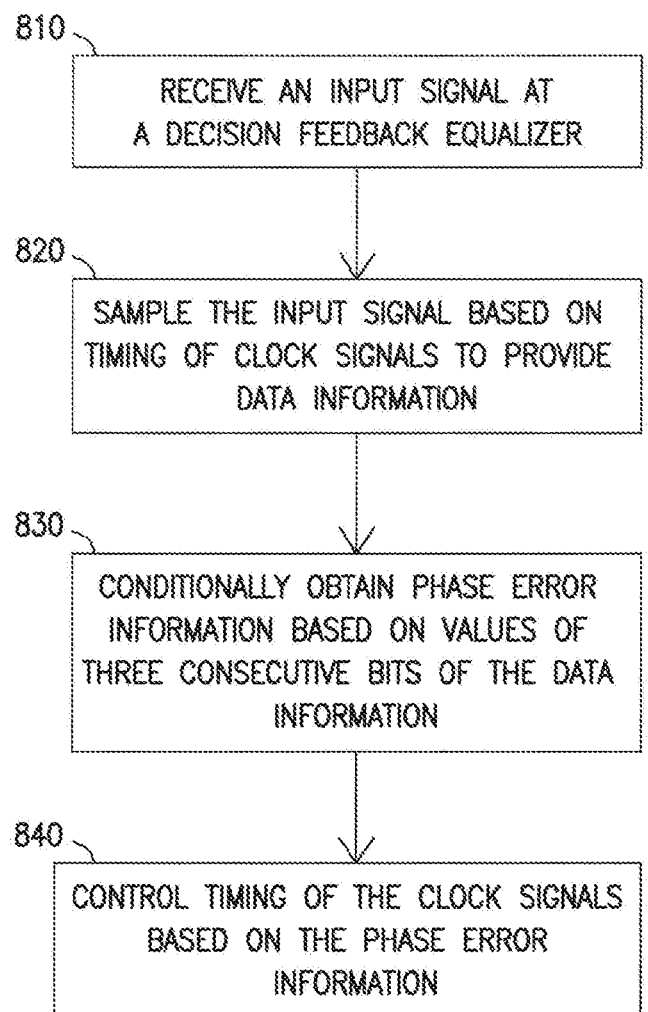
FIG. 8 is a flowchart showing a method of operating a receiver, according to some embodiments described herein.

FIG. 8 is a flowchart showing a method 800 of operating a receiver, according to some embodiments described herein. The receiver used in method 800 can include any of the receivers described above with reference to FIG. 1 through FIG. 7.

As shown in FIG. 8, activity 810 of method 800 can include receiving an input signal at a DFE. The DFE can be included in a receiver. Activity 820 can include sampling the input signal based on timing of clock signals to provide data information. Activity 830 can include conditionally obtaining phase error information based on values of three consecutive bits of the data information. Activity 840 can include controlling timing of the clock signals based on the phase error information.

Method 800 can include fewer or more activities relative to activities 810, 820, 830, and 840 shown in FIG. 8. For example, method 800 can include activities and operations of any DFE and receiver described above with reference to FIG. 1 through FIG. 7.

The illustrations of the apparatuses (e.g., apparatus 100 including receiver 120, 220, and 620, DFE 415, and system 700) and methods (e.g., method 800 and operations of receiver 120, 220, and 620, DFE 415, and system 700) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

ADDITIONAL NOTES AND EXAMPLES

Example 1 includes subject matter (such as a device, circuit apparatus or electronic system apparatus, or machine) including an input to receive an input signal, additional inputs to receive clock signals having different phases to sample the input signal, and a decision feedback equalizer (DFE) having DFE slices, the DFE slices including a number of data comparators to provide data information based on the sampling of the input signal, and a number of phase error comparators to provide phase error information associated with the sampling of the input signal, wherein the number of phase error comparators of the DFE slices is not greater than the number of data comparators of the DFE slices.

In Example 2, the subject matter of Example 1 may optionally include, wherein the number of phase error comparators of the DFE slices is less than the number of data comparators of the DFE slices.

In Example 3, the subject matter of Example 1 may optionally include, wherein the number of phase error comparators of the DFE slices is equal to one-half of the number of data comparators of the DFE slices.

In Example 4, the subject matter of Example 1 may optionally include, wherein each of the DFE slices includes only one of the phase error comparators.

In Example 5, the subject matter of Example 4 may optionally include, wherein each of the phase error comparators is arranged to provide a portion of the phase error information based on values of three consecutive bits of the data information.

In Example 6, the subject matter of Example 1 may optionally include, wherein the DFE includes multiple taps, the multiple taps including a speculative first tap.

In Example 7, the subject matter of Example 1 may optionally include, wherein the clock signals include quadrature clock signals.

Example 8 includes subject matter (such as a device, circuit apparatus or electronic system apparatus, or machine) including receiver lanes, each of the receiver lanes including a decision feedback equalizer to sample an input signal to provide data information and phase error information associated with clock signals used to sample the input signal, a combiner to combine the phase error information from each of the receiver lanes to provide bundled phase error information, and a controller to provide control information, generated based on the bundled phase error information, to each of the receiver lanes to control timing of the clock signals.

In Example 9, the subject matter of Example 8 may optionally include, wherein each of the receiver lanes includes a clock-data recovery loop to adjust phases of the clock signals based on the control information.

In Example 10, the subject matter of Example 8 may optionally include, wherein each of the receiver lanes includes a lane proportional controller to provide an additional control information based on the phase error information, and a selector to select one of the control information generated based on the bundled phase error information and the additional control information to generate a selected control information in order to control the timing of the clock signals based on the selected control information.

In Example 11 the subject matter of Example 10 may optionally include, wherein the lane proportional controller is arranged to increase a loop gain of the clock-data recovery loop by a factor of four if the additional control information is selected by the selector.

In Example 12, the subject matter of Example 8 may optionally include, wherein the decision feedback equalizer (DFE) of each of the receiver lanes includes DFE slices having data comparators to provide the data information, and each of the DFE slices includes only one phase error comparator to provide a portion of the phase error information.

Example 13 includes subject matter (such as a device, circuit apparatus or electronic system apparatus, or machine) including conductive lines on a circuit board, a first device coupled to the conductive lines, and a second device coupled to the conductive lines, the second device including a receiver to receive signals transmitted on the conductive lines by the first device, the receiver including a decision feedback equalizer (DFE) having DFE slices, the DFE slices including a number of data comparators to provide data information based on sampling of one of the signals, and a number of phase error comparators to provide phase error information associated with clock signals used in the sampling, wherein the number of phase error comparators in the DFE slices is less than the number of data comparators of the DFE slices.

In Example 14, the subject matter of Example 13 may optionally include, wherein each of the DFE slices includes only one of the phase error comparators.

In Example 15, the subject matter of Example 13 may optionally include, wherein one of the devices includes an integrated circuit chip.

In Example 16, the subject matter of Example 13 may optionally include, wherein the conductive lines conform with at least one of Universal Serial Bus (USB), DisplayPort (DP), High-Definition Multimedia Interface (HDMI), Thunderbolt, and Peripheral Component Interconnect Express (PCIe) specifications.

Example 17 includes subject matter including a method of operating a receiver, the method comprising receiving an input signal at a decision feedback equalizer, sampling the input signal based on timing of clock signals to provide data information, conditionally obtaining phase error information based on values of three consecutive bits of the data information, and controlling timing of the clock signals based on the phase error information.

In Example 18, the subject matter of Example 17 may optionally include, wherein conditionally obtaining the phase error information includes obtaining the phase error information if a first bit among the three consecutive bits has a first value, a second bit among the three consecutive bits has a second value, and a third bit among the three consecutive bits has the second value, and the first bit is sampled before the second and third bits are sampled.

In Example 19, the subject matter of Example 17 may optionally include, wherein conditionally obtaining the phase error information includes obtaining the phase error information if a first bit among the three consecutive bits has a first value, a second bit among the three consecutive bits has the first value, and a third bit has a second value, and the first bit is sampled before the second and third bits are sampled.

In Example 20, the subject matter of Example 17 may optionally include, receiving an additional input signal at another decision feedback equalizer, sampling the additional input signal based on timing of the clock signals to provide additional data information, conditionally obtaining additional phase error information based on values of three consecutive bits of the additional data information, and controlling timing of the clock signals based on control information generated based on the phase error information and the additional phase error information.

The subject matter of Example 1 through Example 20 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
an input to receive an input signal;
additional inputs to receive clock signals having different phases to sample the input signal; and
a decision feedback equalizer (DFE) having DFE slices, the DFE slices including a number of data comparators to provide data information based on the sampling of the input signal, and a number of phase error comparators to provide phase error information associated with the sampling of the input signal, wherein the number of phase error comparators of the DFE slices is not greater than the number of data comparators of the DFE slices, wherein the DFE slices include a first DFE slice and a second DFE slice, and wherein:
the first DFE slice includes two data comparators among the number of data comparators and one phase error comparator among the number of phase error comparators, each of the two data comparators of the first DFE slice including an input coupled to an input of the phase error comparator of the first DFE slice to receive a same signal as the phase error comparator of first DFE slice; and
the second DFE slice includes two data comparators among the number of data comparators and one phase error comparator among the number of phase error comparators, each of the two data comparators of the second DFE slice including an input coupled to an input of the phase error comparator of the second DFE slice to receive a same signal as the phase error comparator of second DFE slice.

2. The apparatus of claim 1, wherein the number of phase error comparators of the DFE slices is less than the number of data comparators of the DFE slices.

3. The apparatus of claim 1, wherein the number of phase error comparators of the DFE slices is equal to one-half of the number of data comparators of the DFE slices.

4. The apparatus of claim 1, wherein each of the phase error comparators is arranged to provide a portion of the phase error information based on values of three consecutive bits of the data information.

5. The apparatus of claim 1, wherein the DFE includes multiple taps, the multiple taps including a speculative first tap.

6. The apparatus of claim 1, wherein the clock signals include quadrature clock signals.

7. An apparatus comprising:
receiver lanes, each of the receiver lanes including a decision feedback equalizer to sample an input signal to provide data information and phase error information associated with clock signals used to sample the input signal;
a combiner to combine the phase error information from each of the receiver lanes to provide bundled phase error information; and
a controller to provide control information, generated based on the bundled phase error information, to each of the receiver lanes to control timing of the clock signals, wherein each of the receiver lanes includes:
a lane proportional controller to provide an additional control information based on the phase error information; and
a selector to select one of the control information generated based on the bundled phase error information and the additional control information to generate a selected control information in order to control timing of the clock signals based on the selected control information.

8. The apparatus of claim 7, wherein each of the receiver lanes includes a clock-data recovery loop to adjust phases of the clock signals based on the control information.

9. The apparatus of claim 7, wherein the lane proportional controller is arranged to increase a loop gain of the clock-data recovery loop by a factor of four if the additional control information is selected by the selector.

10. The apparatus of claim 7, wherein the decision feedback equalizer (DFE) of each of the receiver lanes includes DFE slices having data comparators to provide the data information, and each of the DFE slices includes only one phase error comparator to provide a portion of the phase error information.

11. A method comprising:
receiving an input signal at a decision feedback equalizer;
sampling the input signal based on timing of clock signals to provide data information;
conditionally obtaining phase error information based on values of three consecutive bits of the data information; and
controlling timing of the clock signals based on the phase error information, wherein the decision feedback equalizer is included in a receiver lane among receiver lanes of a receiver, the receiver lane including a lane proportional controller and a selector, the lane proportional controller providing first control information based on the phase error information, the selector selecting one of the first control information and a second control information generated based on bundled phase error information to generate a selected control information in order to control timing of the clock signals based on the selected control information, wherein the bundled phase error information is provided by a combiner based on a combination of phase error information from each of the receiver lanes.

12. The method of claim 11, wherein conditionally obtaining the phase error information includes obtaining the phase error information if:
a first bit among the three consecutive bits has a first value;
a second bit among the three consecutive bits has a second value; and
a third bit among the three consecutive bits has the second value, and the first bit is sampled before the second and third bits are sampled.

13. The method of claim 11, wherein conditionally obtaining the phase error information includes obtaining the phase error information if:
a first bit among the three consecutive bits has a first value;
a second bit among the three consecutive bits has the first value; and
a third bit has a second value, and the first bit is sampled before the second and third bits are sampled.

14. The method of claim 11, further comprising:
receiving an additional input signal at another decision feedback equalizer of another receiver lane among the receiver lanes of a receiver;
sampling the additional input signal based on timing of the clock signals to provide additional data information;
conditionally obtaining additional phase error information based on values of three consecutive bits of the additional data information; and
providing the additional phase error information to the combiner.

15. An electronic system comprising:
conductive lines on a circuit board;
a first device coupled to the conductive lines; and
a second device coupled to the conductive lines, the second device including a receiver to receive signals transmitted on the conductive lines by the first device, the receiver including a decision feedback equalizer (DFE) having DFE slices, the DFE slices including a number of data comparators to provide data information based on sampling of one of the signals, and a number of phase error comparators to provide phase error information associated with clock signals used in the sampling, wherein the number of phase error comparators in the DFE slices is less than the number of data comparators of the DFE slices, wherein the DFE slices include a first DFE slice and a second DFE slice, and wherein:
the first DFE slice includes two data comparators among the number of data comparators and one phase error comparator among the number of phase error comparators, each of the two data comparators of the first DFE slice including an input coupled to an input of the phase error comparator of the first DFE slice to receive a same signal as the phase error comparator of first DFE slice; and
the second DFE slice includes two data comparators among the number of data comparators and one phase error comparator among the number of phase error comparators, each of the two data comparators of the second DFE slice including an input coupled to an input of the phase error comparator of the second DFE slice to receive a same signal as the phase error comparator of second DFE slice.

16. The electronic system of claim 15, wherein one of the first device and the second device includes an integrated circuit chip.

17. The electronic system of claim 15, wherein the conductive lines conform with at least one of Universal Serial Bus (USB), DisplayPort (DP), High-Definition Multimedia Interface (HDMI), Thunderbolt, and Peripheral Component Interconnect Express (PCIe) specifications.

* * * * *